(12) United States Patent
Keys

(10) Patent No.: US 10,021,462 B2
(45) Date of Patent: Jul. 10, 2018

(54) CONTENT DISTRIBUTION AND ENCODER TESTING TECHNIQUES

(71) Applicant: Time Warner Cable Enterprises LLC, New York, NY (US)

(72) Inventor: Peter Keys, Broomfield, CO (US)

(73) Assignee: Time Warner Cable Enterprises LLC, St. Louis, MO (US)

(*) Notice: Subject to any disclaimer, the term of this patent is extended or adjusted under 35 U.S.C. 154(b) by 0 days.

(21) Appl. No.: 15/071,604

(22) Filed: Mar. 16, 2016

(65) Prior Publication Data
US 2017/0272831 A1    Sep. 21, 2017

(51) Int. Cl.
| H04N 7/173 | (2011.01) |
| H04N 21/61 | (2011.01) |
| H04W 72/04 | (2009.01) |
| H04N 21/6379 | (2011.01) |
| H04N 21/438 | (2011.01) |
| H04N 21/4363 | (2011.01) |
| H04N 21/24 | (2011.01) |
| H04N 21/2387 | (2011.01) |
| H04N 21/4402 | (2011.01) |

(52) U.S. Cl.
CPC ..... *H04N 21/6106* (2013.01); *H04N 21/2387* (2013.01); *H04N 21/2402* (2013.01); *H04N 21/4382* (2013.01); *H04N 21/43635* (2013.01); *H04N 21/440218* (2013.01); *H04N 21/6379* (2013.01); *H04W 72/0453* (2013.01)

(58) Field of Classification Search
CPC ......... H04N 21/4788; H04N 21/25891; H04N 21/4223; H04N 21/41407; H04N 21/4756; H04N 21/2187; H04N 21/44222; H04N 21/812
See application file for complete search history.

(56) References Cited

U.S. PATENT DOCUMENTS

| 2008/0282299 A1* | 11/2008 | Koat | H04L 12/14 725/93 |
| 2009/0323802 A1* | 12/2009 | Walters | H04H 60/04 375/240.01 |
| 2011/0274156 A1* | 11/2011 | Mighani | H04N 21/2381 375/240.02 |

(Continued)

*Primary Examiner* — Fred Peng
(74) *Attorney, Agent, or Firm* — Chapin IP Law, LLC

(57) ABSTRACT

According to one configuration, to test an encoder resource, a user controls operation of both a mobile communication device and a corresponding video management device. For example, the user inputs a command to a test control application executing on the mobile communication device to test encoding of content by the encoder resource. In response to receiving the input command to test a target encoder resource, the test control application on the mobile communication device transmits video information from the mobile communication device to in the video management device. The video management device processes the video information received from the mobile communication device. Using the video information, the video management device derives and outputs a corresponding coded video stream to the encoder resource under test. As its name suggests, the encoder resource encodes the received video stream and transmits it over an assigned channel in a shared communication link.

28 Claims, 10 Drawing Sheets

(56) References Cited

U.S. PATENT DOCUMENTS

2013/0133011 A1* 5/2013 Chhaochharia ......... H04L 47/24
  725/62
2014/0146123 A1* 5/2014 Kumazawa ........ H04N 21/4223
  348/14.02
2016/0282922 A1* 9/2016 Petrovic .................. H04L 43/50

* cited by examiner

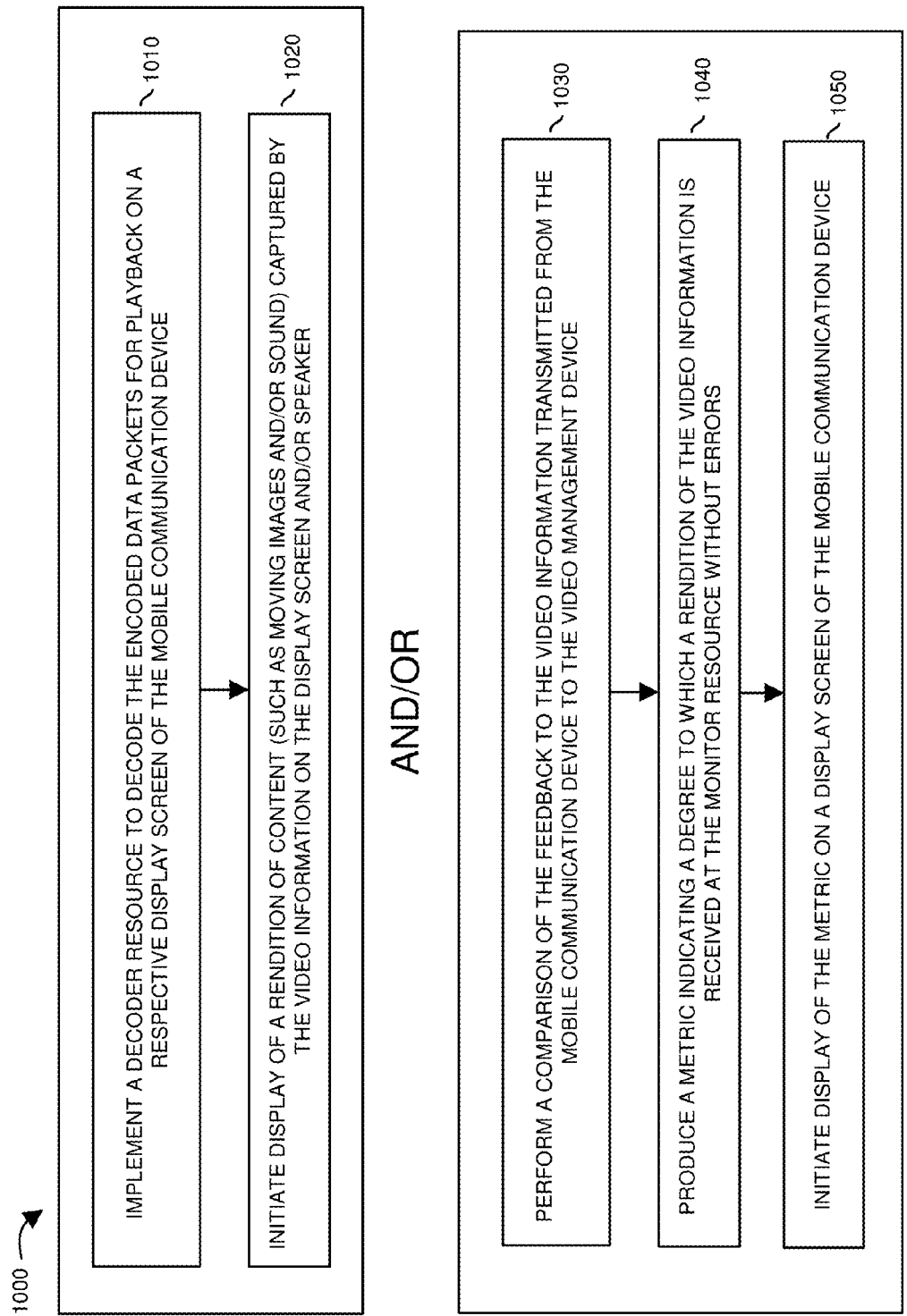

CONTENT DISTRIBUTION AND ENCODER TESTING TECHNIQUES

BACKGROUND

Conventional cable network service providers sometimes provide municipalities or other broadcast/program provider entities such as FOX™, Discovery™, HBO™, etc., the ability to transmit their own content over a communication link of a cable network environment to multiple subscribers. In such an instance, a respective entity may operate a video source and an encoder resource to communicate content to the subscribers. During operation, the video source conveys respective content to the encoder resource. The encoder resource, as its name suggests, encodes the content received from the video source for distribution to multiple downstream devices operated by the subscribers.

Downstream from the encoder resource, a home network (or subscriber domain) can include a cable set-top box to receive the channels of content transmitted over a shared communication link. Via a handheld remote controller device, a subscriber of cable services is typically able to select a channel and playback corresponding content on a television display screen. If desired, the subscriber can select a channel assigned to the respective content delivery entity to view the content supplied by the encoder resource over the shared communication link.

BRIEF DESCRIPTION OF EMBODIMENTS

Unfortunately, encoder resources are prone to experiencing encoding errors. This means that each encoder resource occasionally must be tested to ensure proper operation. According to conventional techniques, a technician must operate complex equipment to inject a test signal into an encoder resource in order to verify its proper operation.

Embodiments herein include novel test equipment (including one or more devices) to test an encoder resource and corresponding conveyance of encoded test content generated by the encoder resource downstream in a content distribution system.

More specifically, according to one embodiment, to test a feed resource and corresponding encoder resource (such as a government/municipal/public feed resource, private entity feed resource such as FOX™, Discovery™, HBO™, etc.), a user such a network technician operates a mobile communication device and a corresponding video management device to input a test signal into the encoder resource under test.

In one embodiment, the user inputs a command to a tester application executing on the mobile communication device to test encoding of content by the encoder resource. For example, in response to receiving the input command to test the encoder resource, the tester application on the mobile communication device transmits corresponding video information (such as a file or stream of video information selected by the technician) from the mobile communication device (such as a smart phone, computer device, etc.) to the video management device over a communication link. The video management device processes the video information received from the mobile communication device to produce a corresponding coded video stream subsequently outputted to the encoder resource under test.

Thus, a combination of the mobile communication device and the video management device (such as custom electronics) can be used to inject a respective test signal into an encoder resource for testing.

Note that the mobile communication device can be communicatively coupled to the video management device in any suitable manner. In one embodiment, the mobile communication device establishes a wireless communication link with the video management device. The tester application in the mobile communication device transmits the video information (potentially selected by the user of the mobile communication device) over the wireless communication link to the video management device.

In one embodiment, the custom video management circuitry (device) selectively outputs the received video information in one or more transmission formats to the encoder resource under test.

For example, the video management device can be configured to include video coder circuitry operable to selectively: i) output the video stream in a first format from a first hardware interface (first connector port) of the video management device to the encoder resource under test, ii) output the video stream in a second format from a second hardware interface (second connector port) of the video management device to the encoder resource under test, and iii) output the video stream in a third format from a third hardware interface (third connector port) of the video management device to the encoder resource under test.

In one embodiment, the first format is an SDI (Serial Digital Interface) format; the second format is an HDMI (High Definition Media Interface) format; and the third format is an analog format. The encoder resource may support any of one or more of these possible formats.

In accordance with further embodiments, and as its name suggests, the encoder resource encodes the video stream (in the selected one of multiple possible formats) received from the video management device. The encoder resource converts the received video stream into encoded data (such as data packets) for transmission over a shared communication link to a network distribution node in a cable network.

In accordance with yet further embodiments, the encoder resource can be configured to transmit the encoded data packets over an assigned channel of the shared communication link. In such an instance, the encoder resource injects the encoded data packets on an assigned channel of a shared communication link downstream to one or more subscriber domains.

The assigned channel may be one of multiple channels in the shared communication link distributing corresponding content to subscribers in the cable network.

The encoder resource can be configured to transmit data downstream on the shared communication link in any suitable manner. For example, in one embodiment, the encoder resource produces the data packets to include network address information associated with network and/or assigned to the encoder resource. That is, the encoder resource encodes each of the encoded data packets to include a network address identifier assigned to the encoder resource under test; the network address identifier indicates the particular encoder resource that transmitted the encoded data packets downstream over the shared communication link to the network distribution node.

Via the identifier value assigned to the data packets, downstream communication devices are able to identify which of multiple received data packets pertain to the encoded video stream generated by the encoder resource under test.

In one embodiment, the monitor resource is communicatively coupled to the shared communication link. The monitor resource monitors the shared communication link for the encoded data packets including the network address identifier of the encoder resource under test. In other words, the monitor resource tunes to an appropriate channel over which the encoder resource transmits the encoded data packets. In this manner, the monitor resource receives the encoded data packets transmitted by the encoder resource.

In accordance with still further embodiments, the monitor resource uses the received data packets to generate feedback to a second technician at a remote location or generate and transit feedback to the mobile communication device.

In one embodiment, the mobile communication device receives feedback such as the encoded data packets from the monitor resource. In such an instance, the mobile communication device can be configured to implement a decoder resource to decode the encoded data packets for playback on a respective display screen of the mobile communication device.

As a more specific example, in one embodiment, the mobile communication device can be configured to decode the received data packets (video information) and initiate display of a rendition of content captured by the encoded data packets (i.e., a rendition of the original video information such as moving images) on the display screen such that the user of the mobile communication device can visually verify (via the playback of such content) that the encoder resource under test properly encodes the original video information provided by the tester application executing on the mobile communication device.

Note that because the feedback is received from the monitor resource at a corresponding remote downstream location with respect to the encoder resource, the integrity of the shared communication link is inherently tested as well as the encoder resource.

Note that as an alternative to relying on a visual test by a respective technician operating the mobile communication device to determine the integrity (health) of the encoder resource, embodiments herein can further include performing a bit by bit analysis to determine whether the encoder resource under test is working properly.

For example, the feedback from the monitor resource can include encoded video data (such as encoded data packets) generated by the encoder resource under test. In one embodiment, the tester application on the mobile communication device is further operable to: compare the received feedback (such as received video data transmitted by the encoder resource under test or derivative data thereof) to original video information conveyed to the encoder resource as a test signal; produce a metric indicating a degree to which the encoded rendition of the original video information is received at the monitor resource without errors; and initiate display of the metric on a display screen of the mobile communication device.

In this manner, the tester application on the mobile communication device apprises the user of the mobile communication device of a degree to which the encoder resource under test properly encodes the original video information received from the video management device.

Note further that subsequent to testing the encoder resource and shared communication link, and verifying that they work properly, embodiments herein further include reconnecting a video source to the previously tested input port (feed) of the encoder resource. The video resource then transmits a corresponding stream of video data to be encoded by the encoder resource. The encoder resource encodes the corresponding stream of video data and transmits it down the shared communication link over the assigned channel to a network distribution node. In one embodiment, as its name suggests, the network distribution node (such as a head end of a cable network environment) broadcasts the encoded video data to each of multiple subscribers communicatively coupled to the shared communication link.

Accordingly, subsequent to testing of a respective encoder resource, the encoder resource can be used to convey encoded content to one or more subscribers over a respective broadcast channel.

These and other more specific embodiments are disclosed in more detail below.

Any of the resources as discussed herein can include one or more computerized devices, mobile communication devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate remote control of a remote media system. The instructions, when executed by computer processor hardware, cause the computer processor hardware (such as one or more processor devices) to: receive input at a mobile communication device, the input generated to test encoding of content by an encoder resource; in response to receiving the input, transmit video information from the mobile communication device to video management circuitry (such as a custom video management device) over a communication link; and from the video management circuitry, output an encoded video stream derived from the video information to the encoder resource under test.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling a remote media system. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 10 is an example diagram illustrating a method of testing an encoder resource according to embodiments herein.

Figure 1:
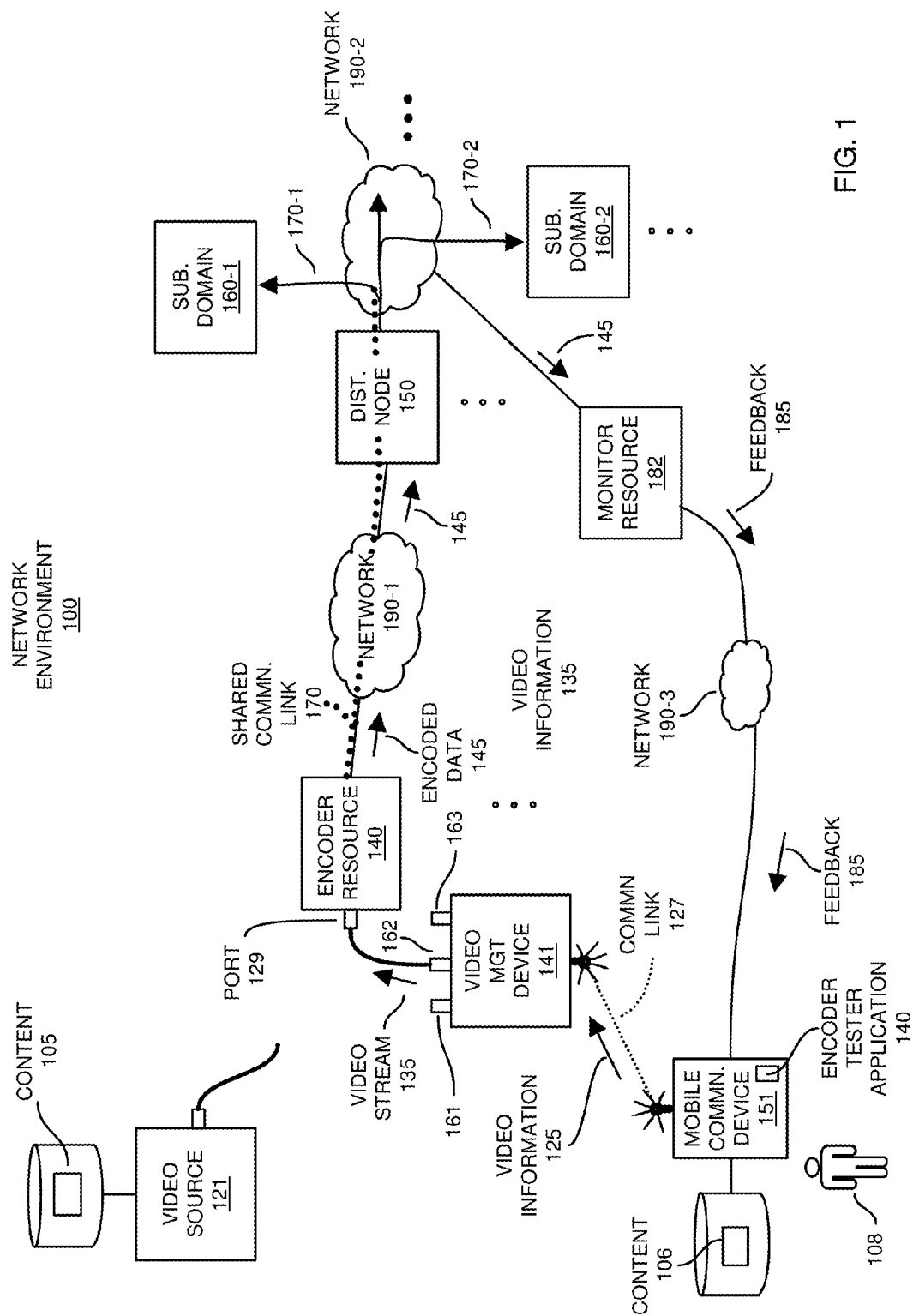
FIG. 1 is an example diagram illustrating a functional block diagram of hardware/software resources to test an encoder resource according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Now, more specifically, FIG. 1 is an example diagram illustrating a functional block diagram of hardware/software resources to test an encoder resource according to embodiments herein.

As shown, according to one embodiment, a user 108 operating the mobile communication device 151 and the video management device 141 in network environment 100 tests the encoder resource 142 and conveyance of corresponding generated encoded data 145 downstream in a content distribution system.

More specifically, according to one embodiment, to test a feed into the shared communication link 170 such as port 129 and corresponding encoder resource 142, the user 108 (such a network technician or other suitable entity) operates mobile communication device 151 and corresponding video management device 141 (such as custom electronic circuitry) to input a test signal into the encoder resource 142 under test.

In furtherance of testing the encoder resource 142, in one embodiment, the user 108 inputs one or more commands to the encoder tester application 140 executing on the mobile communication device 151 to test encoding of content by the encoder resource 142. In one embodiment, the user 108 select amongst identities of multiple test videos displayed on the display screen of the mobile communication device 151.

In response to receiving one or more input commands to test the encoder resource 142, and selection of a particular test video from the test videos, the encoder tester application 140 on the mobile communication device 151 transmits the selected video information 125 (such as a file of video information, video data, etc., associated with the selected video) from the mobile communication device 151 over the communication link 127 to video management device 141. The video management device 141 processes the video information 125 received from the mobile communication device 151 and produces a corresponding coded video stream 135.

The video management device 141 outputs the coded video stream 135 to the encoder resource 142 under test.

Note that the mobile communication device 151 can be communicatively coupled to the video management device 141 in any suitable manner. In one embodiment, the mobile communication device 151 establishes the communication link 127 as a respective wireless communication link (such as WiFi™, Bluetooth™, etc.) with the video management device 141. In such an instance, the encoder tester application 140 in the mobile communication device 151 initiates transmission of segments of the video information 125 (selected by the user of the mobile communication device) over the wireless communication link to the video management device 141.

In one embodiment, the video management device 141 (and corresponding video management circuitry) selectively outputs the received video information 125 in one or more transmission formats to the encoder resource 142 under test.

For example, the video management device 141 can be configured to include a video coder circuit operable to selectively: i) output the video stream 135 in a first format (such as SDI) from a first connector port 161 of the video management device 141, ii) output the video stream 135 in a second format (HDMI) from a second connector port 162 of the video management device 141, and iii) output the video stream 135 in a third format (analog) from a third connector port 163 of the video management device 141.

Each of the ports 161, 162, 163 can be configured to support a different pin configuration, pin number, etc., depending on the type of formatted data outputted from the respective port.

In one embodiment, the user 108 disconnects the video source 121 from being connected to the port 129 and subsequently couples a communication link (such as a physical communication link or cable) between port 162 of the video management device 141 and the input port 129 of the encoder resource 142 to test the encoder resource 142.

As its name suggests, the encoder resource 142 receives the video stream 135 from the video management device 141 in an appropriate coded format. The encoder resource 142 encodes the video stream 135 into encoded data 145 such as encoded data packets.

In accordance with yet further embodiments, the encoder resource 142 can be configured to transmit the encoded data 145 over a corresponding assigned channel of the shared communication link 170. For example, the encoder resource 142 can be configured to inject the generated encoded data 145 on an assigned channel of a shared communication link 170.

In one embodiment, the assigned channel is one of multiple channels in the shared communication link 170 allocated for distribution of content to subscribers in a cable network environment.

By way of non-limiting example embodiment, the encoder resource 142 can be disposed at any location of a respective broadcaster and/or program supplier such as from a government municipality that supplies content, from a private entity that supplies content, etc. The encoder resource 142 provides a way for the content supplier to convey content, data, information, etc., to subscribers residing in a downstream path (i.e., shared communication link 170) over the allocated channel.

The encoder resource 142 transmits the encoded data 145 downstream on the shared communication link 170 in any suitable manner. For example, in one embodiment, the encoder resource 142 produces the encoded data 145 as data packets including network address information (such as network address XYZ) associated with network and/or assigned to the encoder resource. In such an instance, the encoder resource 142 produces each of the encoded data packets to include a network address identifier assigned to the encoder resource 142 under test.

Inclusion of the network address XYZ in the data packets notifies downstream devices that the encoder resource 142 transmitted the respective encoded data 145 downstream over the shared communication link 170 to the network distribution node 150. In other words, via the received network identifier value XYZ assigned to the data packets, downstream communication devices are able to identify which of multiple received data packets pertain to the encoded video stream generated by the encoder resource 142.

In accordance with further embodiments, monitor resource 182 is coupled to the distribution node, shared communication link 170, and/or network 190-2. The monitor resource monitors the shared communication link 170 for any encoded data packets including the network address XYZ assigned to the encoder resource 142. In this manner, the monitor resource 182, at a remote location with respect to the encoder resource 142, receives the encoded data 145 injected by the encoder resource 142 onto the shared communication link 170.

In accordance with still further embodiments, the monitor resource 182 uses the received encoded data 145 (such as received encoded data packets) to generate feedback 185 to the mobile communication device 151 over network 190-3 (such as a cellular link, WiFi™ access point, etc.). For example, in one embodiment, the mobile communication device 151 receives feedback 185 such as the encoded data 145 (or derivative thereof) from the monitor resource 182.

In one embodiment, the monitor resource 182 is a technician verifying integrity of the encoded data 145.

Note that the monitor resource 182 can be or include any suitable resource such as a computer device. In such an instance, the computer device (monitor resource 182) may be operated by a respective second technician that verifies receipt of the encoded data 145 transmitted over the shared communication link 170. By way of non-limiting example embodiment, the second technician may notify the user 108 whether or not the received encoded data 145 has errors.

If desired, the monitor resource 182 can be configured to produce feedback 185 to include the encoded data 145 received by the monitor resource 182 over the shared communication link 170. In such an instance, the mobile communication device 151 implements a decoder resource to decode the encoded data 142 for playback on a respective display screen of the mobile communication device 151. For example, in such an embodiment, the mobile communication device 151 decodes the received encoded data 145 (such as data packets capturing a rendition of video information 125) and initiates display of a rendition of corresponding content captured by the encoded data 145 (i.e., a rendition of the original video information such as moving images) on a respective display screen such that the user 108 of the mobile communication device 151 can visually verify (via playback of such content in the feedback) that the encoder resource 142 under test properly encodes the video stream 135.

Note that because the feedback 185 is received from the monitor resource 182 at a corresponding remote downstream location with respect to the encoder resource 142, verification of the encoded data 145 received by the monitor resource 182 inherently verifies the integrity of the shared communication link 170 over which the encoded data 145 is transmitted.

Note further that as an alternative to, or in addition to, relying on a visual test to determine the integrity (health) of the encoder resource 142 such as based upon playback of images captured by the encoded data 145 either at the monitor resource 182 or at the mobile communication device 151, embodiments herein can further include performing a bit analysis at any suitable location in the network environment 100 to determine whether the encoder resource 142 under test is working properly.

As a more specific example, the feedback 185 from the monitor resource 182 can include encoded data 145 (such as encoded video data packets) generated by the encoder resource 142 under test. In one embodiment, the encoder tester application 140 on the mobile communication device 151 is further operable to: compare the feedback 185 (such as received video data transmitted by the encoder resource 142 under test) to the original video information 125 conveyed as video stream 135 to the encoder resource 142; produce a metric indicating a degree to which the encoded rendition of the original video information 125 is received at the monitor resource 185 without errors; and initiate display of the metric on a display screen of the mobile communication device 151.

In this manner, the encoder tester application 140 on the mobile communication device 151 can be configured to apprise the user 108 of a degree to which the encoder resource 142 under test properly encodes the original video information 125, or video stream 135 received from the video management device 141.

Figure 2:
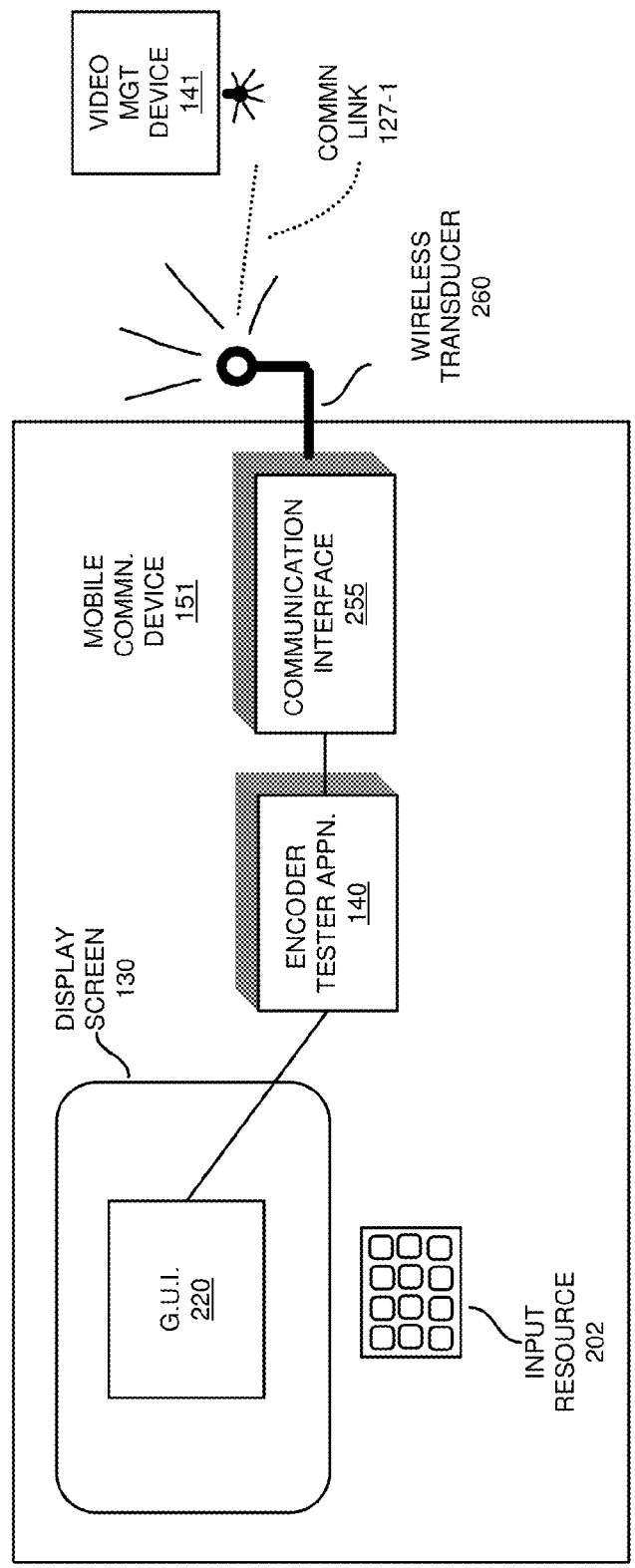
FIG. 2 is an example diagram of a mobile communication device executing an encoder tester application according to embodiments herein.

FIG. 2 is an example diagram of a mobile communication device executing an encoder tester application according to embodiments herein.

Note that mobile communication device 151 can include any suitable hardware and software resources to carry out operations as discussed herein.

More specifically, as shown in this example embodiment, mobile communication device 151 includes input resource 202 (such as a touchpad, mouse, keyboard, buttons, etc.), display screen 130, encoder tester application 140, communication interface 255, wireless transducer 260, etc.

Transducer 260 such as an antenna and corresponding interface supports wireless communications between the mobile communication device and the video management device 141 over wireless communication link 127-1.

Via input of one or more commands to input resource 202, assume that the user 108 initiates execution of encoder tester application 140. In one embodiment, subsequent to execution, the encoder tester application 140 communicates with communication interface 255 to establish a respective wireless communication link 127-1 with corresponding video management device 141.

As previously discussed, the user 108 communicatively couples an appropriate output (such as one of port 161, port 162, port 163, etc.) of the video management device 141 to the input port 129 of the encoder resource 142. Each may have a unique connector configuration. Thus, the user 108 can use a combination of both communication device 151 and the video management device 141 to test the encoder resource 142.

Further in this example embodiment, as previously discussed, the communication interface 255 establishes a respective wireless communication link 127-1 with the video management device 141. The wireless communication link 127-1 enables the respective mobile communication device 151 to transmit communications such as video information 125 to the video management device 141.

As further shown, the encoder tester application 140 initiates display of the graphical user interface 220 on display screen 130. The graphical user interface 220 can be configured to enable the respective user 108 to perform functions such as select video content that will be used to test the encoder resource 142, initiate start of a respective test, etc.

Additionally, in one embodiment, as previously discussed, the encoder tester application 140 can be configured to receive feedback 185 from remote monitor resource 182. In one embodiment, the encoder tester application 140 utilizes the received feedback 185 to reproduce a visual rendition of the original video information 125 on display screen 130 for viewing by the user 108. In other words, the encoder tester application 140 receives the encoded data 145, or derivative thereof, and initiates display of corresponding images associated with the original video information 125 (after encoding by encoder resource 142 and subsequent decoding) on display screen 130.

Figure 3:
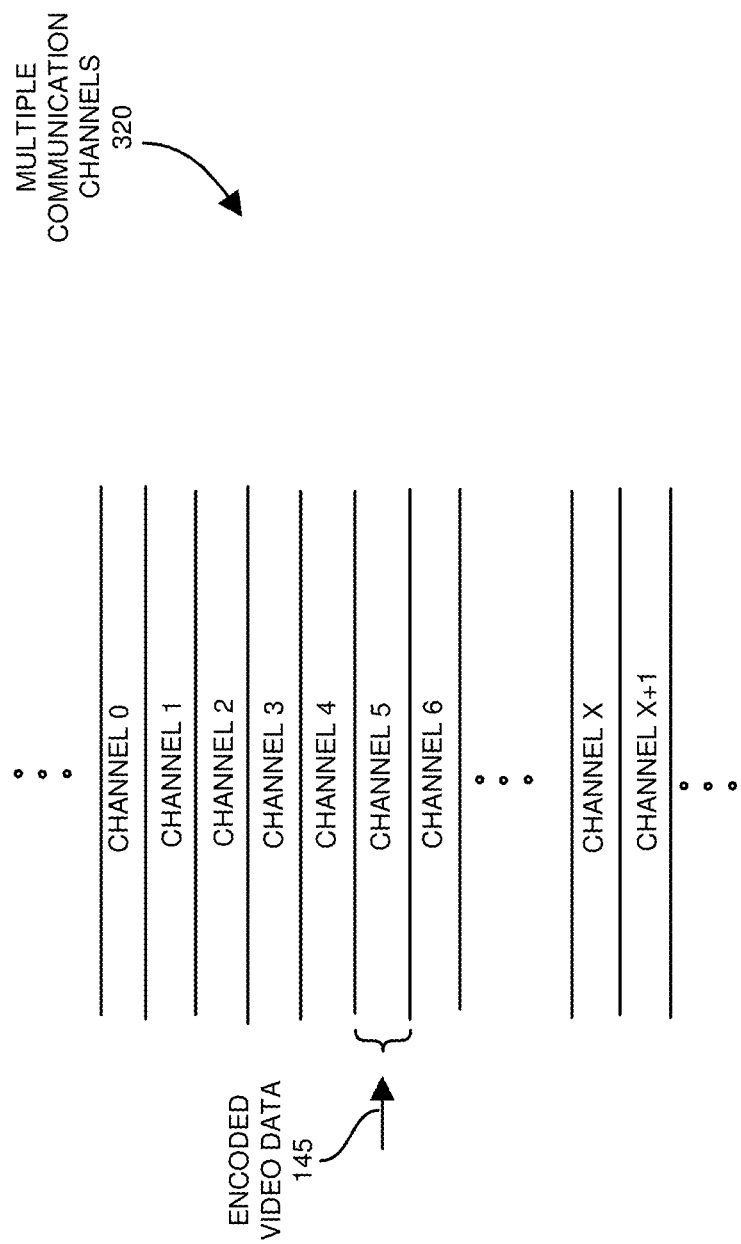
FIG. 3 is an example diagram illustrating injection of encoded video data by an encoder resource under test onto an assigned channel according to embodiments herein.

FIG. 3 is an example diagram illustrating injection of encoded video data by an encoder resource under test onto an pre-assigned channel of a multiple-channel communication link according to embodiments herein.

In this example embodiment, channel #5 of the multiple communication channels 320 of shared communication link 170 is pre-assigned for use by encoder resource 142 to transmit corresponding encoded content downstream for subsequent distribution by distribution node 150 (such as a head end of a cable network) to multiple subscribers. The other channels such as channel #0, channel #1, channel #2, channel #3, channel 4, channel #6, channel #7, etc., support conveyance of additional content to subscribers. Thus, as shown, the allocated channel #5 assigned for use by the encoder resource 142 is interleaved amongst multiple channels conveyed over the shared communication link 170.

Figure 4:
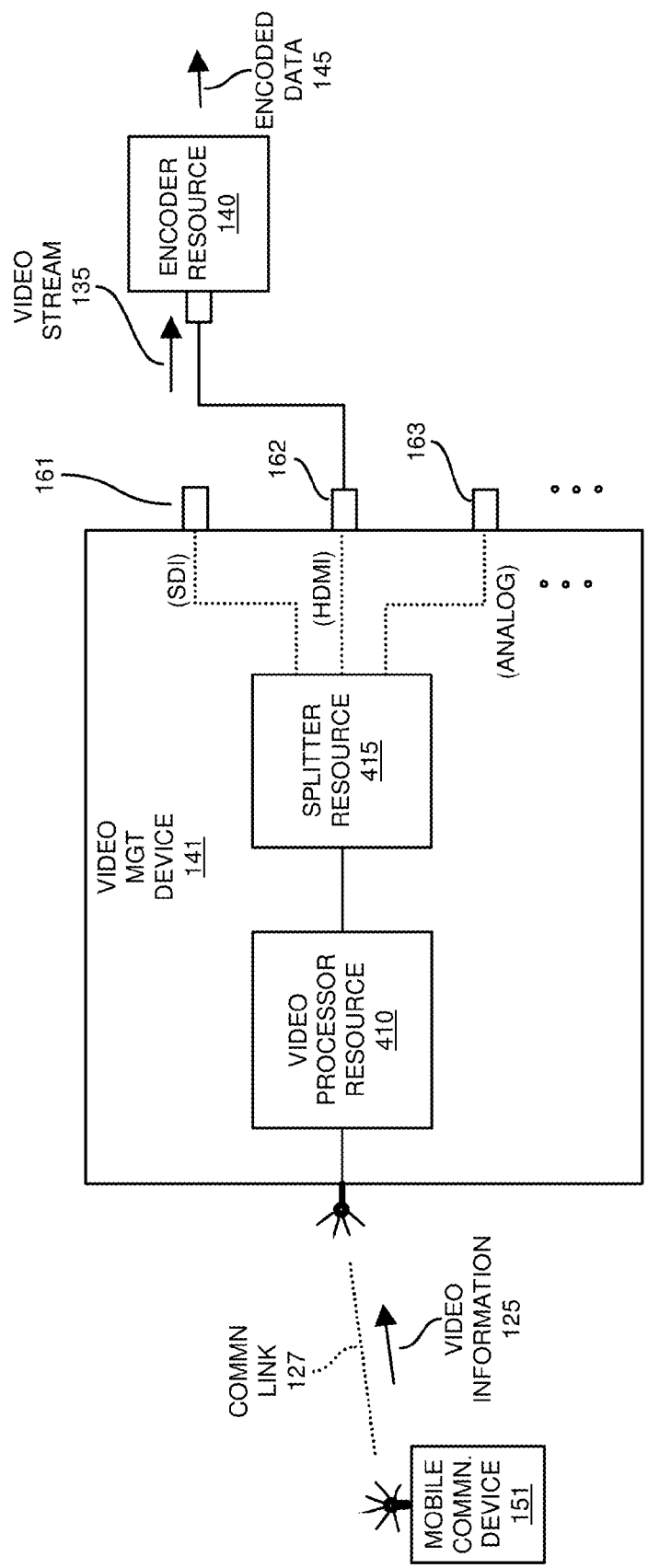
FIG. 4 is an example diagram illustrating combined use of a mobile communication device and a corresponding video management device to test an encoder resource according to embodiments herein according to embodiments herein.

FIG. 4 is an example diagram illustrating of a more detailed view of a video management device used in conjunction with a mobile communication device according to embodiments herein according to embodiments herein.

In this example embodiment, the video management device 141 includes video processor resource 410 as well as splitter resource 415. During operation, as previously discussed, the video management device 141 receives video information 125 transmitted from the mobile communication device 151. The processor resource 410 converts the received video information 125 into one or more appropriate formats. Splitter resource 415 outputs the coded video information 125 generated by the video processor resource 410 to the appropriate ports 161, 162, 163.

In one embodiment, the splitter resource 415 outputs (simultaneously or at different times) a rendition of the video information 125 in a first format such as an SDI (Serial Digital Interface) format from port 161; the splitter resource 115 outputs a rendition of the video information 125 in a second format such as an HDMI (High Definition Media Interface) format from port 162; and the splitter resource 115 outputs a rendition of the video information 125 in a third format such as an analog format from port 163.

The encoder resource 420 under test can be configured to support any of one or more of these possible formats. The user of the mobile communication device 151 initiates generation and output of an appropriate one or more of these video streams (SDI, HDMI, analog, etc.) from the video management device 141 into the encoder resource 142 under test.

In accordance with further embodiments, and as its name suggests, the encoder resource 142 encodes the video stream 135 received from the video management device 141. In one embodiment, as previously discussed, the encoder resource 142 converts the received video stream 135 into encoded data packets, encoded data segments, etc., (any suitable format) for transmission over a shared communication link 170 to a network distribution node 150 in a cable network.

In accordance with further example embodiments, the video management device 141 (and corresponding video management circuitry such as video processor resource 410 and splitter resource 415) selectively outputs the received video information 135 in one or more transmission formats to the encoder resource 142 under test. For example, the video processor resource 410 can be or include a video coder circuit operable to selectively: i) output the video stream 135 in a first format from a first hardware interface (port 161) of the video management device 141, ii) output the video stream 135 in a second format from a second hardware interface (port 162) of the video management device 141, and iii) output the video stream 135 in a third format from a third hardware interface (port 163) of the video management device 141.

As mentioned, each of ports 161, 160, and 163 can be a different style of connector with respect to each other.

Figure 5:
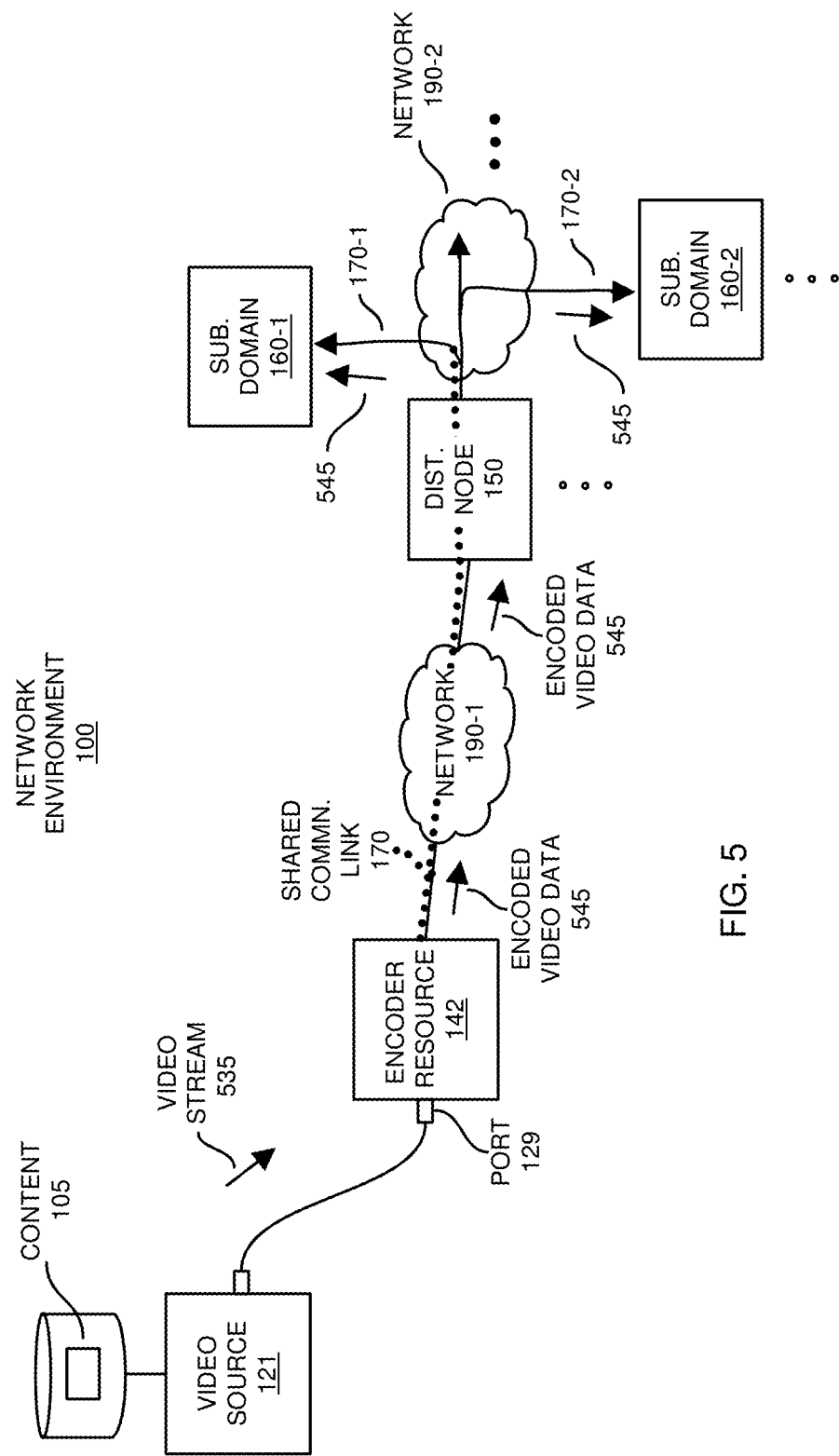
FIG. 5 is an example diagram illustrating generation and injection of encoded video data over an assigned channel of a shared communication link subsequent to testing according to embodiments herein.

FIG. 5 is an example diagram illustrating generation and injection of encoded video data on a channel of a shared communication link subsequent to testing according to embodiments herein.

More specifically, note further that subsequent to testing the encoder resource 142 and channel #5 of the shared communication link 170, and verifying that such components work properly in which bit encoding errors from the encoder resource 142 is below an error threshold value, embodiments herein further include disconnecting the video management device 141 from the encoder resource 142 and coupling (reconnecting) an output of the video source 121 to the previously tested input port 129 (feed) of the encoder resource 142. The video source 121 then transmits a corresponding stream of video data (in this instance, video stream 535) to be encoded by the encoder resource 142. The encoder resource 142 encodes the corresponding video stream 535 and transmits it as encoded video data 545 down the shared communication link 170 over the assigned channel #5 to the network distribution node 150.

In one embodiment, as its name suggests, the network distribution node 150 further facilitates broadcast of the corresponding encoded video data 545 to each of multiple subscriber domains 160 and corresponding subscribers in the network environment 100 communicatively coupled to the shared communication link 170.

Occasional or periodic testing of the encoder resource 142 and the shared communication link 170 in a manner as described herein ensures that the video stream 535 and corresponding encoded video 545 is relatively error free (such as below the error threshold value).

Figure 6:
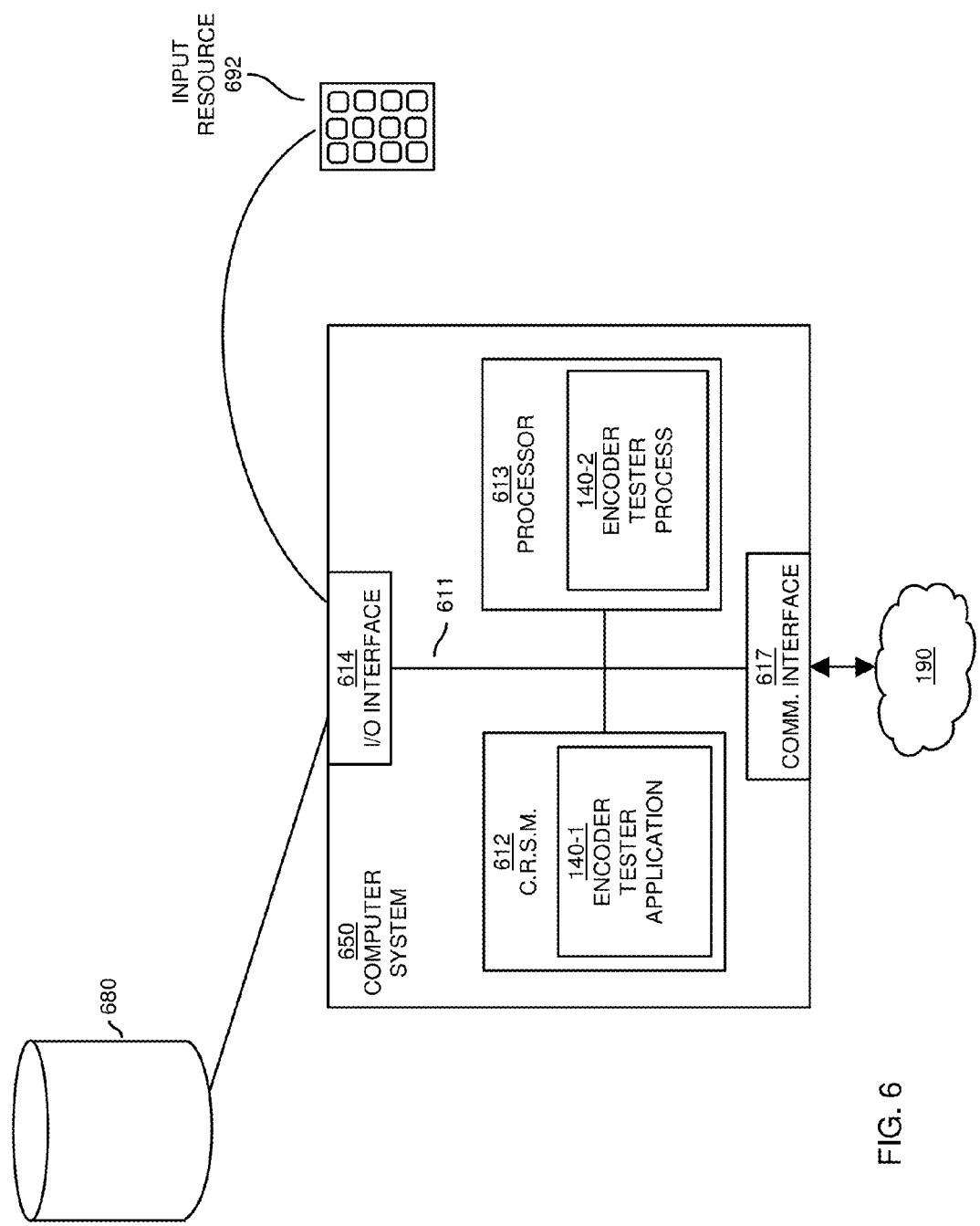
FIG. 6 is a diagram illustrating an example computer architecture to execute operations according to embodiments herein.

FIG. 6 is an example block diagram of a computer system for implementing any of the operations as discussed herein according to embodiments herein.

Any of the resources (e.g., mobile communication device 151, video management device 141, encoder resource 142, etc.) can be configured to include a processor and executable instructions to carry out the different operations as discussed herein.

As shown, computer system 650 of the present example can include an interconnect 611 that couples computer readable storage media 612 such as a non-transitory type of media (i.e., any type of hardware storage medium) in which digital information can be stored and retrieved, a processor 613, I/O interface 614, and a communications interface 617. I/O interface 614 supports connectivity to repository 680 and input resource 692.

Computer readable storage medium 612 can be any hardware storage device such as memory, optical storage, hard drive, floppy disk, etc. In one embodiment, the computer readable storage medium 612 stores instructions and/or data.

As shown, computer readable storage media 612 can be encoded with encoder tester application 140-1 (e.g., including instructions) to carry out any of the operations as discussed herein.

During operation of one embodiment, processor 613 accesses computer readable storage media 612 via the use of interconnect 611 in order to launch, run, execute, interpret or otherwise perform the instructions in encoder tester application 140-1 stored on computer readable storage medium 612. Execution of the encoder tester application 140-1 produces encoder tester process 140-2 to carry out any of the operations and/or processes as discussed herein.

Those skilled in the art will understand that the computer system 650 can include other processes and/or software and hardware components, such as an operating system that controls allocation and use of hardware resources to encoder tester application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 650 may reside at any location or can be included in any suitable resource in any network environment to implement functionality as discussed herein.

Functionality supported by the different resources will now be discussed via flowcharts in FIGS. 7-10. Note that the steps in the flowcharts below can be executed in any suitable order.

Figure 7:
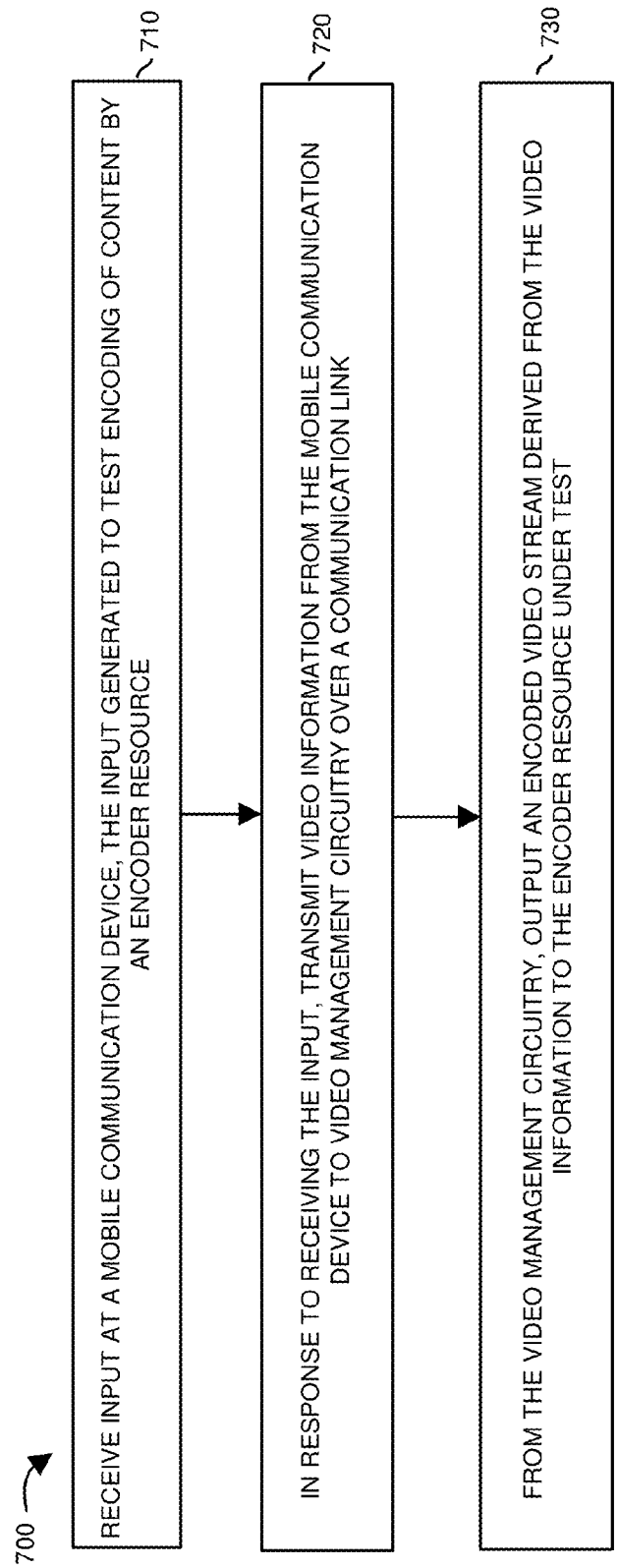
FIG. 7 is an example diagram illustrating a method of testing an encoder resource according to embodiments herein.

FIG. 7 is a flowchart 700 illustrating an example method according to embodiments. Note that there will be some overlap with respect to concepts as discussed above.

In processing operation 710, the encoder tester application 140 receives an input command from the user 108. The user 108 generates the input command to test the ability of the encoder resource 142 under test to encode content.

In processing operation 720, in response to receiving the input command, the encoder tester application 140 transmits video information 125 from the mobile communication device 151 to the video management device 141 (video management circuitry) over communication link 127.

In processing operation 730, the video management device 141 outputs an encoded video stream 135 derived from the video information 125 to the encoder resource 142 under test.

Figure 8:
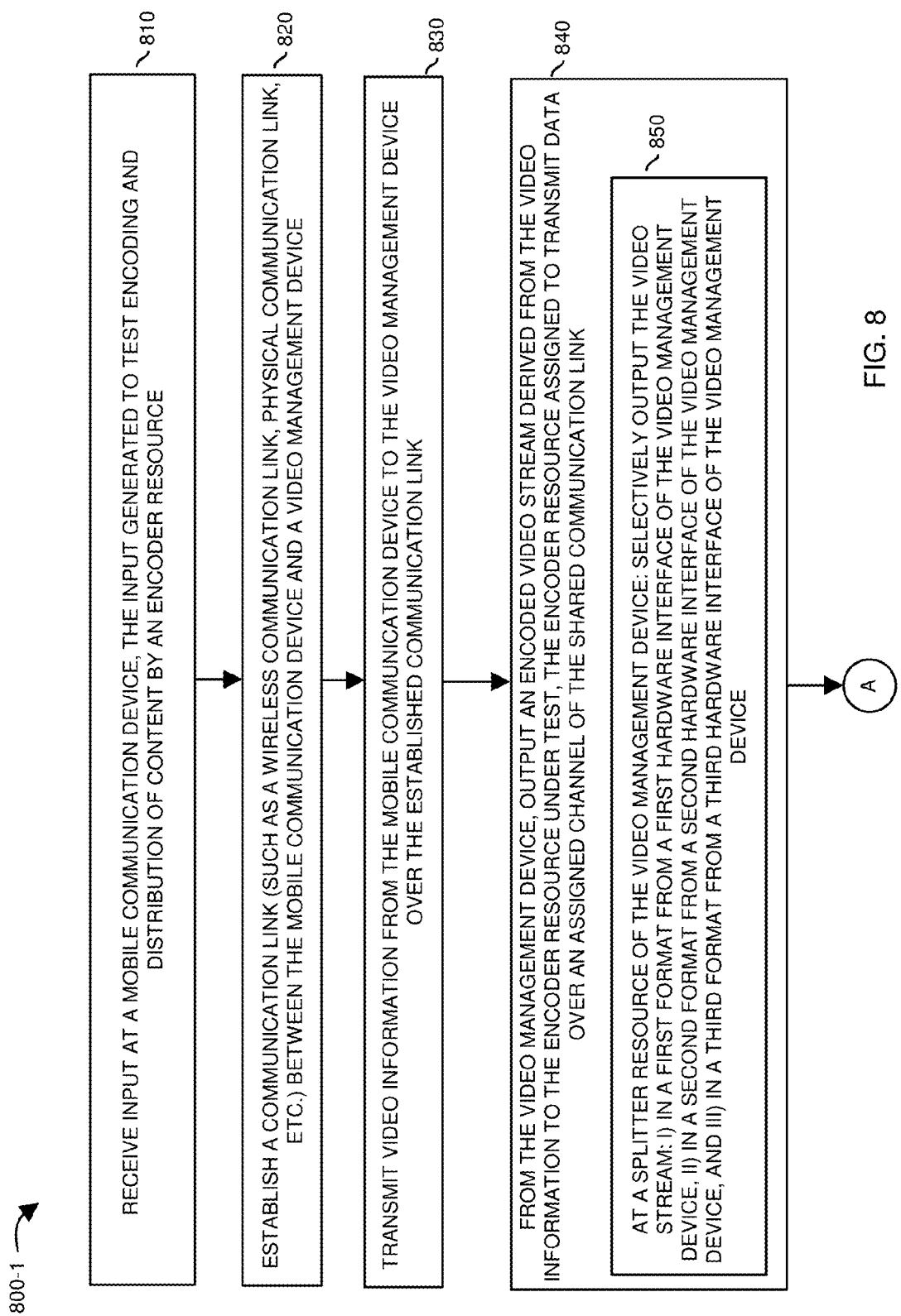
FIGS. 8 and 9 combine to form an example diagram illustrating a method of testing an encoder resource according to embodiments herein.
Figure 9:
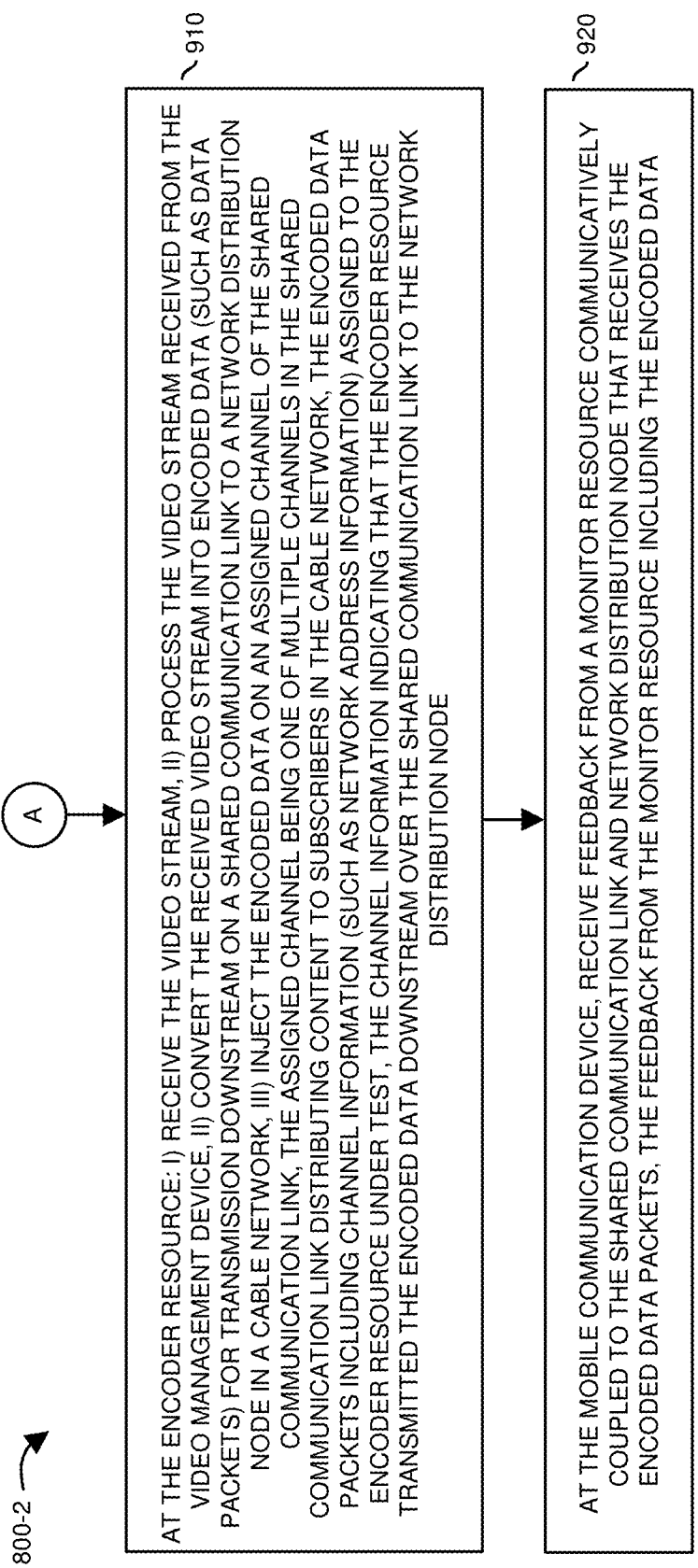

FIGS. 8 and 9 combine to form a flowchart 800 (flowchart 800-1 and flowchart 800-2) illustrating an example method according to embodiments. Note that there will be some overlap with respect to concepts as discussed above.

In processing operation 810 of flowchart 800-1 (FIG. 8), the mobile communication device 151 receives input from the user 108 to test encoding and distribution of content by the encoder resource 142.

In processing operation 820, the encoder tester application 140 executing on the mobile communication device 151 establishes a communication link 127 (such as over a wireless communication link, physical communication link, etc.) between the mobile communication device 151 and the video management device 141.

In processing operation 830, the encoder tester application 140 initiates transmission of video information 125 from the mobile communication device 151 to the video management device 141 over the established communication link 127.

In processing operation 840, the video management device 141 uses the received video information 125 to output a coded video stream 135 derived from the video information 125 to the encoder resource under test 142. In one embodiment, as previously discussed, the encoder resource 142 is assigned to transmit data over an assigned channel (such as channel #5) of the shared communication link 170.

In sub-processing operation 850 associated with operation 840, video processor resource 410 and/or splitter resource 415 of the video management device 141: selectively outputs the video stream 135: i) in a first format from a first hardware communication interface (such as port 161) of the video management device 141, ii) in a second format from a second hardware communication interface (such as port 162) of the video management device 141, and iii) in a third format from a third hardware communication interface (such as port 163) of the video management device 141.

In processing operation 920 of flowchart 800-2 in FIG. 9, the encoder resource 140: i) receives the video stream 135 from the video management device 141, ii) processes the video stream 135, ii) converts the received video stream 135 into encoded data 145 (such as data packets) for transmission downstream on shared communication link 170 to network distribution node 150 in a respective cable network environment 100, iii) injects the encoded data 145 on an assigned channel #5 of the shared communication link 170. The assigned channel #5 is one of multiple channels in the shared communication link 170 available for distributing content to subscribers in the cable network. In one embodiment, the encoded data 145 includes channel identifier information (such as network address information or tag information) assigned to the encoder resource 142 under test, the channel identifier information or tag information indicates that the encoder resource 142 transmitted the encoded data 145 downstream over the shared communication link 170 to the network distribution node 150.

In processing operation 820, the encoder tester application 140 at the mobile communication device 151 receives feedback 185 from a monitor resource 182 communicatively coupled to the shared communication link 170 and/or network distribution node 150. The feedback 185 can be any suitable information. For example, the feedback 185 can be a voice communication from a technician indicating that the encoded data 145 is received with errors below a threshold value. Alternatively, in one embodiment, the feedback 185 includes encoded data 145 (such as data packets, segments of content, etc.) or video information derived from the encoded data 145.

FIG. 10 is a flowchart 1000 illustrating further example methods according to embodiments. Note that there will be some overlap with respect to concepts as discussed above.

In processing operation 1010, the encoder tester application 140 implements a decoder resource to decode the encoded data 145 for playback on a respective display screen 130 of the mobile communication device 151 and/or the video management device 141.

In processing operation 1020, the encoder tester application 140 initiates display of a rendition of content (such as moving images and/or sound) captured by the video information such as on the display screen 130 and/or speaker of the mobile communication device 151 or other suitable multimedia player on a different device.

Note that the encoder tester application 140 or other suitable resource can be configured to alternatively or additionally execute further operations below.

In processing operation 1030, to determine occurrence of any encoding errors by the encoder resource 142, the encoder tester application 140 or other suitable resource performs a comparison of the feedback 185 (or derivative of video information thereof) to the original video information 125 transmitted from the mobile communication device 151 to the video management device 141.

In processing operation 1040, the encoder tester application 140 or other suitable resource produces a metric indicating a degree to which a rendition of the video information is received at the monitor resource without errors.

In processing operation 1050, the encoder tester application 140 or other suitable resource initiates display of the metric on a display screen 130 of the mobile communication device 151, apprising the user 108 of the ability of the encoder resource 141 under test to encode content without errors.

Note again that techniques herein are well suited to facilitate testing of encoder resources and corresponding conveyance of encoded data over a communication link. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
receiving an input command at a mobile communication device, the input command inputted to test encoding of content by an encoder resource under test;
in response to receiving the input command at the mobile communication device, transmitting video information from the mobile communication device to video management circuitry over a first communication link, the video management circuitry operable to output an encoded video stream derived from the video information to the encoder resource under test, the encoder resource under test operable to convert the encoded video stream into encoded data transmitted from the encoder resource under test over an assigned channel of a second communication link, the encoded data including tag information indicating the encoder resource under test as a source from which the encoded data is transmitted; and
receiving feedback, the feedback generated by a monitor resource communicatively coupled to the second communication link, the monitor resource operable to produce the feedback based on receipt of the encoded data over the second communication link.

2. The method as in claim 1, wherein the video management circuitry is operable to:
selectively output the video stream: i) in a first format from a first hardware interface of the video management circuitry, ii) in a second format from a second hardware interface of the video management circuitry, and iii) in a third format from a third hardware interface of the video management circuitry.

3. The method as in claim 1, wherein the assigned channel is one of multiple channels in the second communication link distributing corresponding content to subscribers in a network.

4. The method as in claim 1 further comprising:
receiving the feedback from the monitor resource that monitors the second communication link.

5. The method as in claim 4 further comprising:
performing a comparison of video data in the feedback to the video information;
based on the comparison, producing a metric indicating a degree to which an encoded version of the video information is received at the monitor resource without errors.

6. The method as in claim 1 further comprising:
initiating playback of video data obtained from the feedback as moving images on a display screen.

7. The method as in claim 1 further comprising:
establishing the first communication link as a wireless communication link between the mobile communication device and the video management circuitry; and
transmitting the video information over the wireless communication link from the mobile communication device to the video management circuitry.

8. The method as in claim 1 further comprising:
providing connectivity between a selected port of multiple output ports of the video management circuitry to an input port of the encoder resource under test; and
transmitting the encoded video stream out of the selected port of the video management circuitry to the input port of the encoder resource under test.

9. The method as in claim 1, wherein the encoder resource under test transmits the encoded data over the assigned channel to test an ability of encoder resource under test to produce the encoded data without errors.

10. The method as in claim 1, wherein a technician operates the mobile communication device and the video management circuitry to test the encoder resource under test, the technician communicatively coupling a port of the video management circuitry to a port of the encoder resource under test, the video management circuitry outputting the video stream from the port of the video management circuitry to the port of the encoder resource under test.

11. The method as in claim 10 further comprising:
performing a comparison of the encoded data in the feedback to the video information;
producing a metric indicating a degree to which the video information is received at the monitor resource without errors; and
initiating display of the metric.

12. The method as in claim 1, wherein the video management circuitry is operable to convey the video stream to the encoder resource under test in a selected format depending on which port of multiple ports of the video management circuitry is connected to the encoder resource under test.

13. The method as in claim 1, wherein receiving the feedback includes:
receiving the feedback at the mobile communication device.

14. The method as in claim 1 further comprising:
utilizing the feedback to determine a degree to which the monitor resource received the encoded data generated by the encoder resource under test without errors.

15. The method as in claim 14, wherein receiving the feedback includes:
receiving the feedback at the mobile communication device.

16. The method as in claim 14, wherein utilizing the feedback includes:
implementing a decoder resource to decode the encoded data into decoded data for playback on a respective display screen of the mobile communication device; and
using the decoded data, initiating display of a rendition of content captured by the video information on the respective display screen.

17. The method as in claim 16, wherein the tag information is a network address assigned to the encoder resource under test; and
wherein the encoded data includes encoded data packets, each of the encoded data packets including the network address assigned to the encoder resource under test, presence of the network address in each of the encoded data packets indicating that the encoder resource under test transmitted the encoded data packets downstream over the second communication link.

18. A system comprising:
a mobile communication device;
video management circuitry;
the mobile communication device operable to receive an input command to test encoding of content by an encoder resource under test, the mobile communication device operable to provide video information to the video management circuitry over a first communication link in response to receiving the input command; and
the video management circuitry operable to output an encoded video stream derived from the video information to the encoder resource under test, the encoder resource under test operable to convert the encoded video stream into encoded data transmitted from the encoder resource under test over an assigned channel of a second communication link, the encoded data including tag information indicating the encoder resource as a source from which the encoded data is transmitted;

the mobile communication device operable to:
receive feedback, the feedback generated by a monitor resource communicatively coupled to the second communication link, the monitor resource operable to produce the feedback based on receipt of the encoded data over the second communication link; and utilize the feedback to determine a degree to which the monitor resource received the encoded data generated by the encoder resource under test without errors.

19. The system as in claim 18, wherein the encoder resource under test is operable to convert the received video stream into encoded data packets for transmission over the second communication link.

20. The system as in claim 18, wherein the mobile device receives the
feedback from the monitor resource, the feedback including encoded data packets;
the mobile communication device operable to implement a decoder resource to decode the encoded data packets for playback on a respective display screen.

21. The system as in claim 20, wherein each of the encoded data packets includes tag information indicating that the encoder resource under test transmitted the encoded data packets downstream over the second communication link.

22. The system as in claim 18, wherein the video management circuitry is operable to selectively output the encoded video stream: i) in a first format from a first hardware interface of the video management circuitry, ii) in a second format from a second hardware interface of the video management circuitry, and iii) in a third format from a third hardware interface of the video management circuitry.

23. The system as in claim 22, wherein the first format is an SDI (Serial Digital Interface) format;
wherein the second format is an HDMI (High Definition Media Interface) format; and
wherein the third format is an analog format.

24. The system as in claim 19, wherein the assigned channel is one of multiple channels in the second communication link.

25. The system as in claim 18, wherein the mobile communication device is further operable to:
perform a comparison of the feedback to the video information;
produce a metric indicating the degree to which a rendition of the video information is received at the monitor resource without errors.

26. The system as in claim 25, wherein a technician operates the mobile communication device and provides the video management circuitry to test the encoder resource under test, the mobile communication device controlling the video management circuitry.

27. The system as in claim 26,
wherein the assigned channel of the second communication link is allocated for use by a corresponding entity to inject video into the second communication link.

28. Computer-readable storage hardware having instructions stored thereon, the instructions, when carried out by computer processor hardware, causes the computer processor hardware to:
receive input at a mobile communication device, the input generated to test encoding of content by an encoder resource under test;
in response to receiving the input, transmit video information from the mobile communication device to video management circuitry over a first communication link, the video management circuitry operable to output an encoded video stream derived from the video information to the encoder resource under test, the encoder resource under test operable to convert the encoded video stream into encoded data transmitted from the encoder resource under test over an assigned channel of a second communication link, the encoded data including tag information indicating the encoder resource under test as a source from which the encoded data is transmitted;
receive feedback at the mobile communication device, the feedback generated by a monitor resource communicatively coupled to the second communication link, the monitor resource operable to produce the feedback based on receipt of the encoded data over the second communication link; and
utilize the feedback to determine a degree to which the monitor resource received the encoded data generated be the encoder resource under test without errors.

* * * * *

UNITED STATES PATENT AND TRADEMARK OFFICE
CERTIFICATE OF CORRECTION

PATENT NO. : 10,021,462 B2
APPLICATION NO. : 15/071604
DATED : July 10, 2018
INVENTOR(S) : Peter Keys It is certified that error appears in the above-identified patent and that said Letters Patent is hereby corrected as shown below:

In the Claims

Column 18, Line 44, "be" should be changed to --by--.

Signed and Sealed this
Third Day of March, 2020

Andrei Iancu
*Director of the United States Patent and Trademark Office*